UNITED STATES PATENT OFFICE.

LÉON JAROSSON, OF NEW YORK, N. Y.

IMPROVEMENT IN PREPARATIONS OF ARCHIL.

Specification forming part of Letters Patent No. 9,027, dated June 15, 1852.

*To all whom it may concern:*

Be it known that I, LÉON JAROSSON, of the city, county, and State of New York, have invented or discovered a new and useful Improvement in the Process of Manufacturing Archil for Coloring Purposes; and I do hereby declare the following to be a full, clear, and exact description of the method of making the same.

The present manufactured article of archil in use has heretofore been manufactured principally in France, and is imported into this country at a cost of about twenty-three cents per pound, (the first cost being about one franc per pound and the duty twenty-five per cent.,) and requires about six months to distil and prepare it for commercial uses. By my process I can, from the *Lichen rocellus*, prepare an article which has been proven to be equal to the French in thirty days at an expense of less than one-half of that of the imported article.

To enable others skilled in the art to make and use my invention, I will proceed to describe the ingredients, their proportions, and the manner of distilling or brewing the same.

A suitable place for manufacturing the article should be selected, shaded from the rays of the sun, and where there should exist a constant temperature of from 15° to 20° Reaumur. The *Lichen rocellus* should be first cleansed of the dust, &c., and the leaves well opened. I then take a suitable wooden vessel, (a common clean barrel answering a very good purpose,) which should be perfectly clean, and lay it on its side, a hole about six inches in diameter being made therein for the purpose of introducing the materials, and which hole should have a tight-fitting cover. I then place in the vessel or barrel the following ingredients, viz: first, thirty pounds of the lichen; second, two gallons of volatile alkali, as ammonia; third, two gallons of stale urine; fourth, twelve gallons of lime-water, clear and fully saturated. This mixture should be well brewed by stirring it with a wooden spatula from one end of the barrel to the other. When the whole is well moistened put a wet linen cloth over the hole and press down the cover tightly. The first week it should be brewed for five or six minutes morn, noon, and night; the second week twice a day; the third and fourth weeks once a day, after which it is ready for use.

By this simple process I have never failed to produce a good article, while the former more expensive processes often fail. The archil of itself is of a crimson color; but by using it as a basis and modifying it with indigo, quercitron, &c., all the richer tints of violet, maroon, bronze, purple, and lilac are produced, and is universally used in giving the richer colors to carpets, &c.

Having thus fully described the nature of my invention, what I claim therein as new, and desire to secure by Letters Patent, is—

Mixing and treating *Lichen rocellus* with a volatile alkali, urine, and clear and fully saturated lime-water in the proportions and after the manner herein substantially set forth, for the purpose of producing a coloring-matter known as "archil."

LÉON JAROSSON.

Witnesses:
   CHAS. W. NEWTON,
   F. POPELIN.